(12) United States Patent
Erkocak

(10) Patent No.: US 11,841,729 B2
(45) Date of Patent: Dec. 12, 2023

(54) JOYSTICK WITH INCREASED ENDURANCE

(71) Applicant: MAKERSAN MAKINA OTOMOTIV SANAYI TICARET ANONIM SIRKETI, Kocaeli (TR)

(72) Inventor: Levent Erkocak, Kocaeli (TR)

(73) Assignee: MAKERSAN MAKINA OTOMOTIV SANAYI TICARET ANONIM SIRKETI, Kocaeli (TR)

(*) Notice: Subject to any disclaimer, the term of this patent is extended or adjusted under 35 U.S.C. 154(b) by 352 days.

(21) Appl. No.: 17/422,187

(22) PCT Filed: Mar. 11, 2019

(86) PCT No.: PCT/TR2019/050153
§ 371 (c)(1),
(2) Date: Jul. 10, 2021

(87) PCT Pub. No.: WO2020/145914
PCT Pub. Date: Jul. 16, 2020

(65) Prior Publication Data
US 2022/0091627 A1    Mar. 24, 2022

(30) Foreign Application Priority Data

Jan. 10, 2019  (WO) ................ PCT/TR2019/050026

(51) Int. Cl.
*G05G 9/047* (2006.01)
*G05G 1/04* (2006.01)
(Continued)

(52) U.S. Cl.
CPC ........... *G05G 9/047* (2013.01); *E02F 9/2004* (2013.01); *G05G 1/04* (2013.01); *G05G 25/04* (2013.01);
(Continued)

(58) Field of Classification Search
CPC ......... E02F 9/2004; G05G 1/04; G05G 9/047; G05G 25/04; G05G 2009/04718; G05G 2009/04755
See application file for complete search history.

(56) References Cited

U.S. PATENT DOCUMENTS

| 9,870,021 | B2 * | 1/2018 | Olsson | ................... G06F 3/0338 |
| 2008/0280640 | A1 * | 11/2008 | Wedel | ................... G06F 3/0338 455/556.1 |
| 2018/0356854 | A1 * | 12/2018 | Spiteri | ..................... G01D 5/26 |

* cited by examiner

*Primary Examiner* — Nitin Patel
*Assistant Examiner* — Cory A Almeida
(74) *Attorney, Agent, or Firm* — Bayramoglu Law Offices LLC

(57) ABSTRACT

A joystick for controlling a machine comprising; a handle assembly allowed to rotate around a central axis extending along a longitudinal direction of the joystick, a control portion having a casing in which a lower circuit with a lower sensor is provided and a control lever attached to the said casing so as to move pivotally about at a pivot axis which extends perpendicularly to the longitudinal axis of the control lever. Advantageously, said control lever having at least one embedded lower magnet is manufactured from plastic by the injection molding; said control lever comprises: at least one pivotal protrusion extending outwardly from the control lever for bearing in a housing of a casing; said pivotal protrusion forming a monolithic structure with the control lever by said injection molding and in that said lower magnet is embedded within the pivotal protrusion to be in the proximity of said lower circuit.

14 Claims, 10 Drawing Sheets

(51) Int. Cl.
*G05G 25/04* (2006.01)
*E02F 9/20* (2006.01)
(52) U.S. Cl.
CPC .......... *G05G 2009/04718* (2013.01); *G05G 2009/04755* (2013.01)

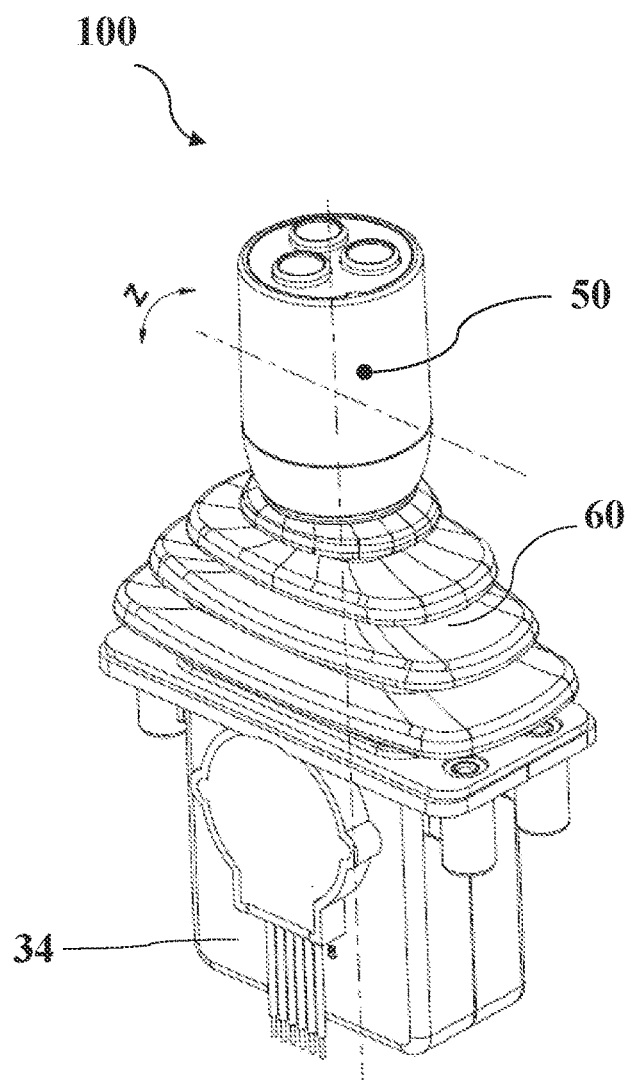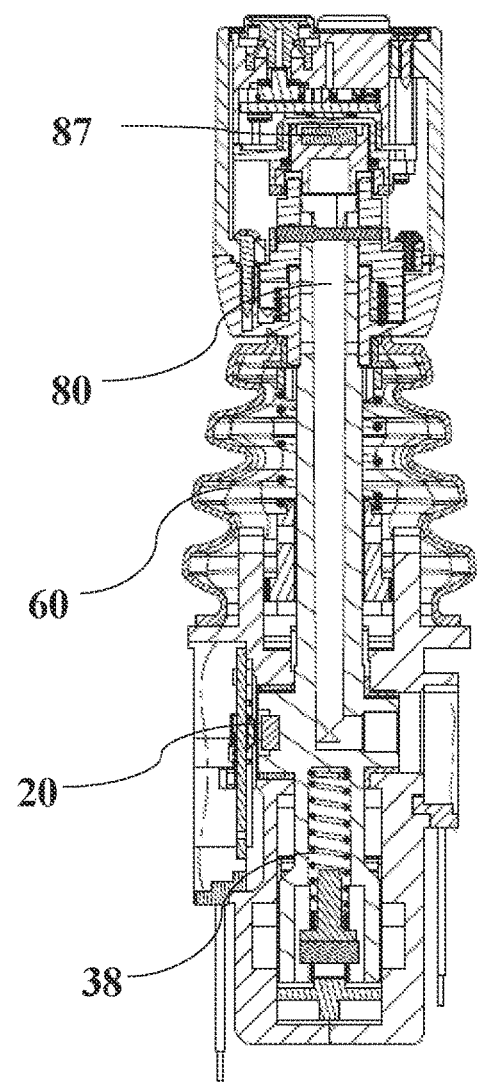
FIG. 3A
FIG. 3B

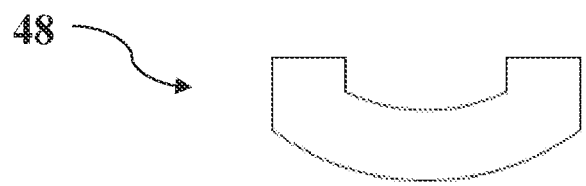
FIG. 10
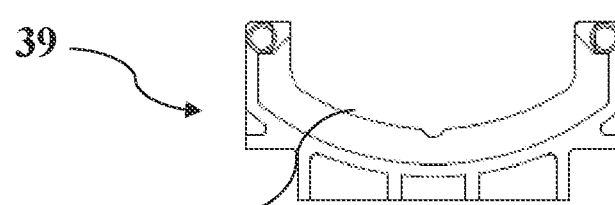
FIG. 11
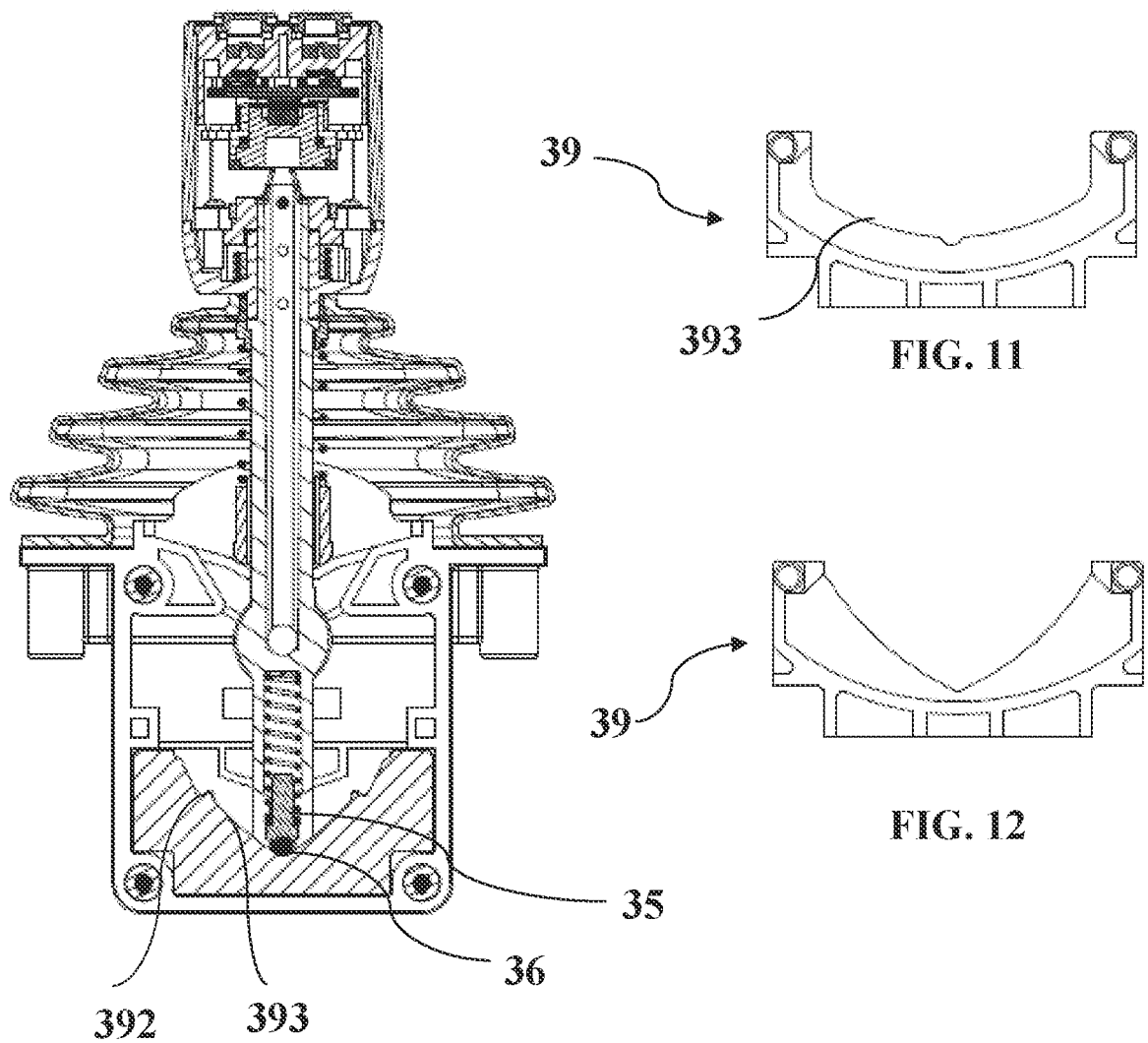
FIG. 12
FIG. 9
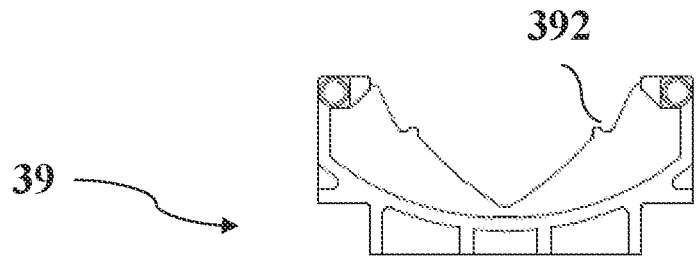
FIG. 13

JOYSTICK WITH INCREASED ENDURANCE

CROSS REFERENCE TO THE RELATED APPLICATIONS

This application is the national phase entry of International Application No. PCT/TR2019/050153, filed on Mar. 11, 2019, which is based upon and claims priority to International Patent Application No. PCT/TR2019/050026, filed on Jan. 10, 2019, the entire contents of which are incorporated herein by reference.

TECHNICAL FIELD

The present invention relates to a control device and more particularly to an improved control lever allowing adjustment of the orientation of the joystick for controlling movement and operation of an industrial device with increased endurance.

BACKGROUND

Joystick controllers are used in a wide variety of motion control applications that is used to control an engine speed and is mounted a grip chassis of a control lever, such that the operating apparatus can rotate relative to the grip man chassis. Additively, the joystick with a control lever, which is mounted for pivotal movement relative to a body, triggers the motion and translates operator manipulations to electrical control signals.

In the art, joysticks for industrial applications using various wireless technologies are known to achieve the real-time motion in which positioning the magnet within the control arm is extremely important. However, the fact that the control arms are made of metal and that the magnet is not placed in a precise position leads to inaccurate measurements due to the difficulties in manufacturing. The needs for additional operation of the magnet to attach to the metal control arm causes the cost of manufacturing.

Some electronic control devices use buttons to trigger function such as implement float, however, this may cause inadvertent inducing motion. In the art, the joystick having detent member is known in the art to achieve feedback mechanism in which sensing a haptic effect is extremely significant. A control device suitable for handling equipment in the related art include a switching rod and seat member disclosed in US200601.91.775. A problem in this prior art is that, especially when in locked position, the haptic effect may not be employed in devices to alert the user to specific events and said the device may not be able to provide significant feedback to create greater sensory immersion.

The robust design is critical for hydraulic controls in an industrial application, especially for the proportional control one-double acting hydraulic function. Additively, industrial device with increased endurance provides long life required in demanding environmental condition such as construction and forestry. Therefore, it is necessary to measure the angular position of the control lever without error to provide synchronized grip in line with user demands. It is still desirable that a joystick having a float mechanism provide a lock assembly to prevent movement of the control lever in the direction which controls vertical movement.

Existing control devices, however, there is still a need for compact, durable control devices configured for compact motion and ease of use to sense the deformation of motion. Thanks to the haptic feedback element, the control device can provide a realistic feedback to the user.

SUMMARY

The primary object of the present invention is to provide a control device which is capable of producing an output signal of more versatile contents than was possible with a conventional device.

Another object of the present invention is to provide such a control device which is both economical and durable.

Another object of the present invention is to provide a joystick which prevents an undesired vibration by comprising required structure that retain the magnet at the same position, so that it has an increased security.

Another object of the present invention is to provide a joystick which allows easy assembly by using fewer parts compared to the art and provides a more secure system by eliminating dislocation of the magnet.

Designing the safe and simple joystick is a demand for machines with multiple high current implementations so as to expand the capabilities of motion control. The control lever for a heavy equipment according to the present invention is formed to be used in industrial filed, agriculture, marine vessels, aviation and similar fields of operation. The present invention suggests a joystick for controlling a machine and operation of an industrial device with increased endurance mainly comprising a handle assembly allowed to rotate around a central axis extending along a longitudinal direction of the joystick, a control portion having a casing in which a lower circuit with a lower sensor is provided and a control lever attached to a housing disposed on the casing so as to move pivotally about at a pivot axis which extends perpendicularly to the longitudinal axis of the control lever wherein said control lever having at least one embedded lower magnet is manufactured from plastic by the injection molding; said joystick further comprises at least one pivotal protrusion extending outwardly from the control lever for bearing in a housing of a casing; said pivotal protrusion forming a monolithic structure with the control lever by said injection molding and in that said lower magnet is embedded within the pivotal protrusion to be in the proximity of said upper circuit.

In a preferred embodiment said control lever further comprises a second pivotal protrusion arranged in an opposite side of the control lever, said second pivotal protrusion having at least one hole is configured as an outlet opening defined by an inner wall of the second pivotal protrusion. Moreover, said control lever may have a channel extending from an upper end of the control lever facing to an upper rotary body to the second pivotal protrusion, such that the channel enables the connection members to be guided through the control lever to protect them from external interferences.

BRIEF DESCRIPTION OF THE DRAWINGS

FIG. 3A is a perspective of the joystick according to the present invention.

FIG. 3B is a longitudinal cross-sectional view the joystick according to the present invention.

FIG. 9 is a longitudinal cross-sectional view of the joystick.

FIG. 10 is a schematic view of the friction surface according to present invention.

FIG. 11 is a schematic view of a bottom guiding portion of the joystick according to the present invention.

FIG. 12 is a schematic view of a bottom guiding portion of the joystick according to the present invention.

FIG. 13 is a schematic view of a bottom guiding portion of the joystick according to the present invention.

DETAILED DESCRIPTION OF THE EMBODIMENTS

Figure 1:
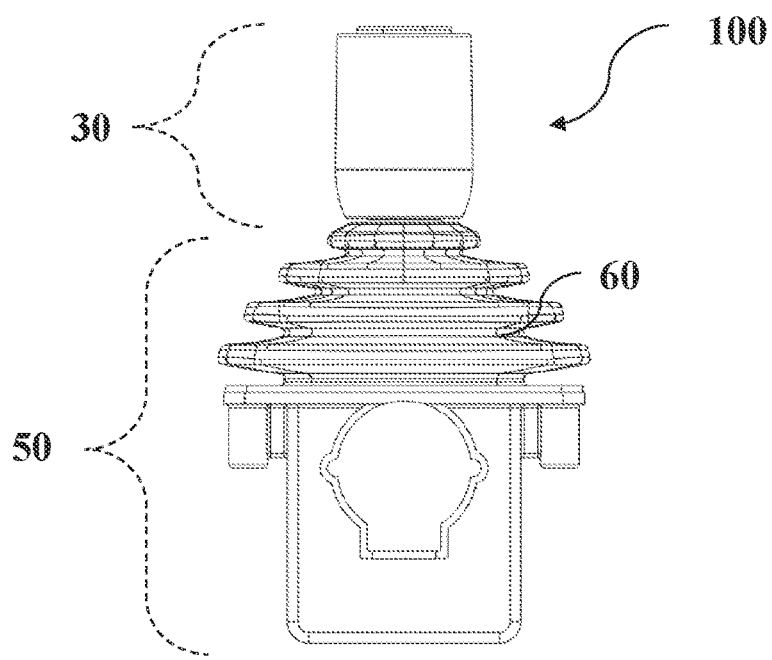
FIG. 1 is a perspective of the joystick according to the present invention.

The invention will now be described in detail with reference to the accompanying drawings, wherein reference numerals assigned to the parts therein are listed as follows;
- 20. Lower magnet
- 30. Control portion
- 31. Bushing
- 32. Spring
- 33. Spring locking ring
  - 331. Recess
- 34. Casing
  - 341. Front cover
  - 342. Rear Cover
  - 343. Housing
  - 344. Housing
  - 345. Housing
  - 348. Recess
- 35. Ball holder
  - 351. Groove
- 36. Ball
- 37. Retention plate
- 38. Spring
- 39. Bottom guiding portion
  - 392. Stopping structure
  - 393. Upper surface
- 40. Sealing plate
- 44. Lower circuit
- 45. Locking plate
  - 451. Groove
  - 452. Cylindrical channel
  - 453. Protrusion
- 47. Lower sensor
- 50. Handle assembly
- 51. Button plate
- 54. Upper rotary body
- 55. Fixing ring
- 57. Locking member
- 58. Upper pin
- 59. Spring
- 60. Flexible boot
- 61. Spring arm
- 62. Protrusion
- 63. Handle housing
- 70. Button body
- 71. Button spring
- 72. Button
- 73. Sealing member
- 74 Upper circuit
- 75. Upper magnet housing
- 77. Locking ring
- 78. Button switch
- 80. Control lever
  - 802. Pivotal protrusion
  - 803. Hole
  - 801. Pivotal protrusion
  - 806. Lower end
  - 808. Protrusion
  - 809. Channel
- 87. Upper magnet
- 90. Upper lever part
- 100. Joystick A control device for a heavy equipment according to the present invention is formed to be used in various industrial fields, such as agriculture, marine vessels, aviation and similar fields of operation. The present invention suggests a, joystick (100) for controlling a machine and operation of an industrial device with increased endurance mainly comprising: a handle assembly (50) allowed to rotate around a central axis extending along a longitudinal direction of the joystick (100), a control portion (30) having a casing (34) in which a lower circuit (44) with a lower sensor (47) is provided and a control lever (80) attached to the said casing (34) so as to move pivotally about at a pivot axis which extends perpendicularly to the longitudinal axis of the control lever (80) wherein—said control lever (80) having at least one embedded lower magnet (20) is manufactured from plastic by the injection molding. Said joystick (100) further comprises:—at least one pivotal protrusion (802) extending outwardly from the control lever (80) for bearing in a housing (343) of a casing (34); said pivotal protrusion (802) forming a monolithic structure with the control lever (80) by said injection molding and in that said lower magnet (20) is embedded within the pivotal protrusion (802) to be in the proximity of said lower circuit (44).

In the injection molding process of the control lever (80), the lower magnet (20) is placed into the injection mold and the control lever (80) is produced as a whole with the embedded lower magnet (20) inside as shown in FIG. 1. Therefore, the production costs of a control lever (80) where the lower magnet (20) is securely held are minimized. Further, dislocation or drooping of the lower magnet (20) from the control lever (80) is also prevented which in results a more secure joystick (100) is achieved.

Figure 5:
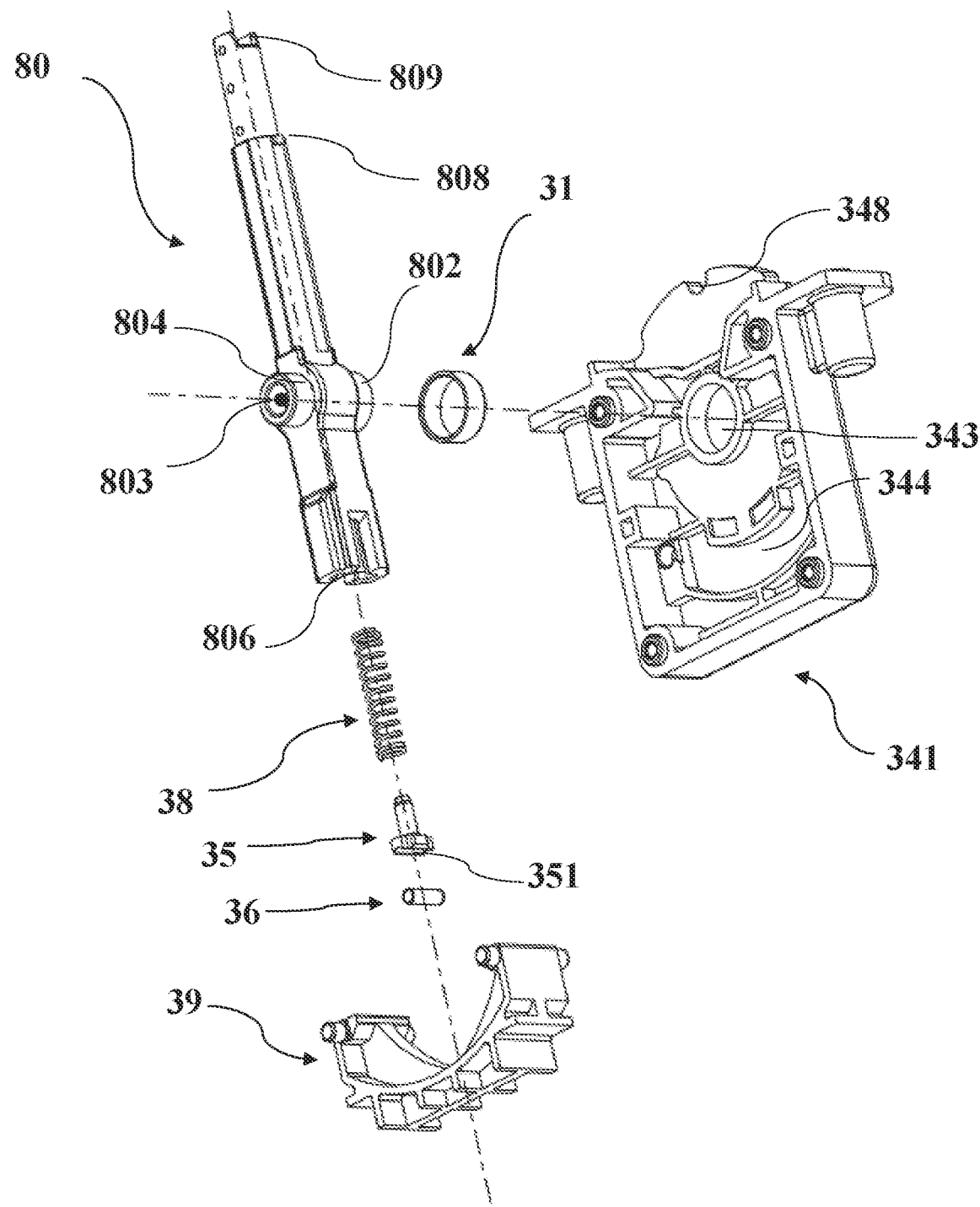
FIG. 5 is partially exploded perspective view of the joystick according to the present invention.

In a possible embodiment, said control lever (80) further comprises a second pivotal protrusion (804) arranged in an opposite side of the control lever (80), said second pivotal protrusion (804) having at least one hole (803) is configured as an outlet opening defined by an inner wall of the second pivotal protrusion (804) as shown in FIG. 5.

Moreover, said control lever (80) has a channel (809) extending from an upper end of the control lever (80) facing to an upper rotary body (54) to the second pivotal protrusion (804), such that the channel (809) enables the connection members to be guided through the control lever (80) to protect them from external interferences. By means of said pivotal protrusion (804) and said channel (809), main problems such as rupture and de-linking in the cables are reduced, and a joystick (100) which is resistant to long term use is provided. Preferably, there is a bushing (31) provided on the pivotal protrusion (802) for eliminating the bearing problem and increasing operating time of the control lever (80).

Figures 2A, 2B:
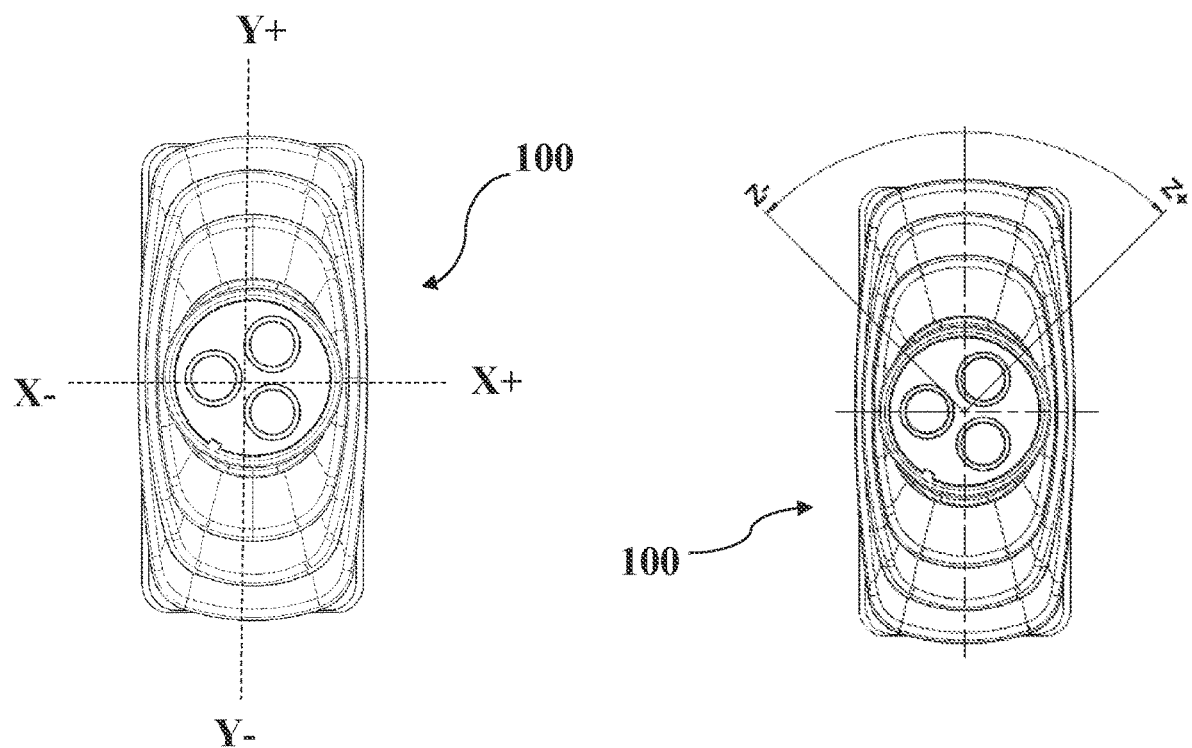
FIG. 2A is an upper perspective of the joystick indicating X and Y axes according to the present invention.
FIG. 2B is an upper view of the joystick indicating the Z axis according to the present invention.
Figure 6:
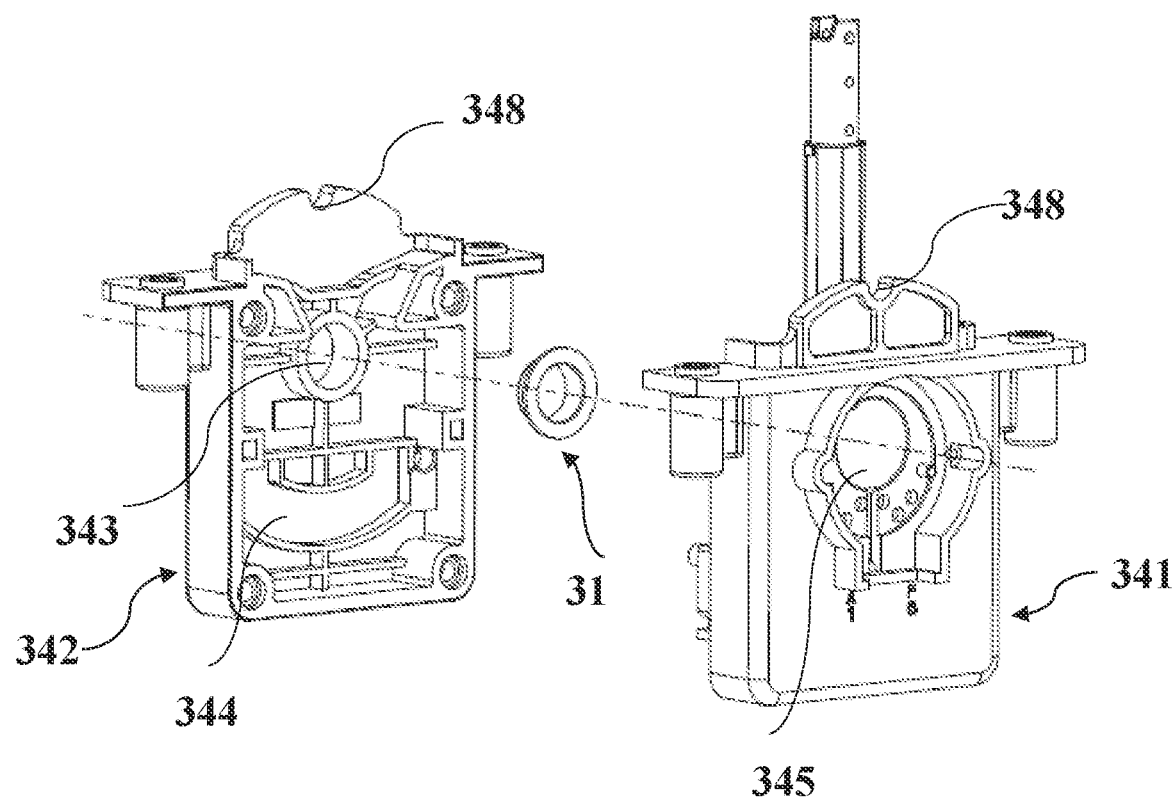
FIG. 6 is a perspective view of the rear and front cover of the casing according to the present invention.
Figure 7:
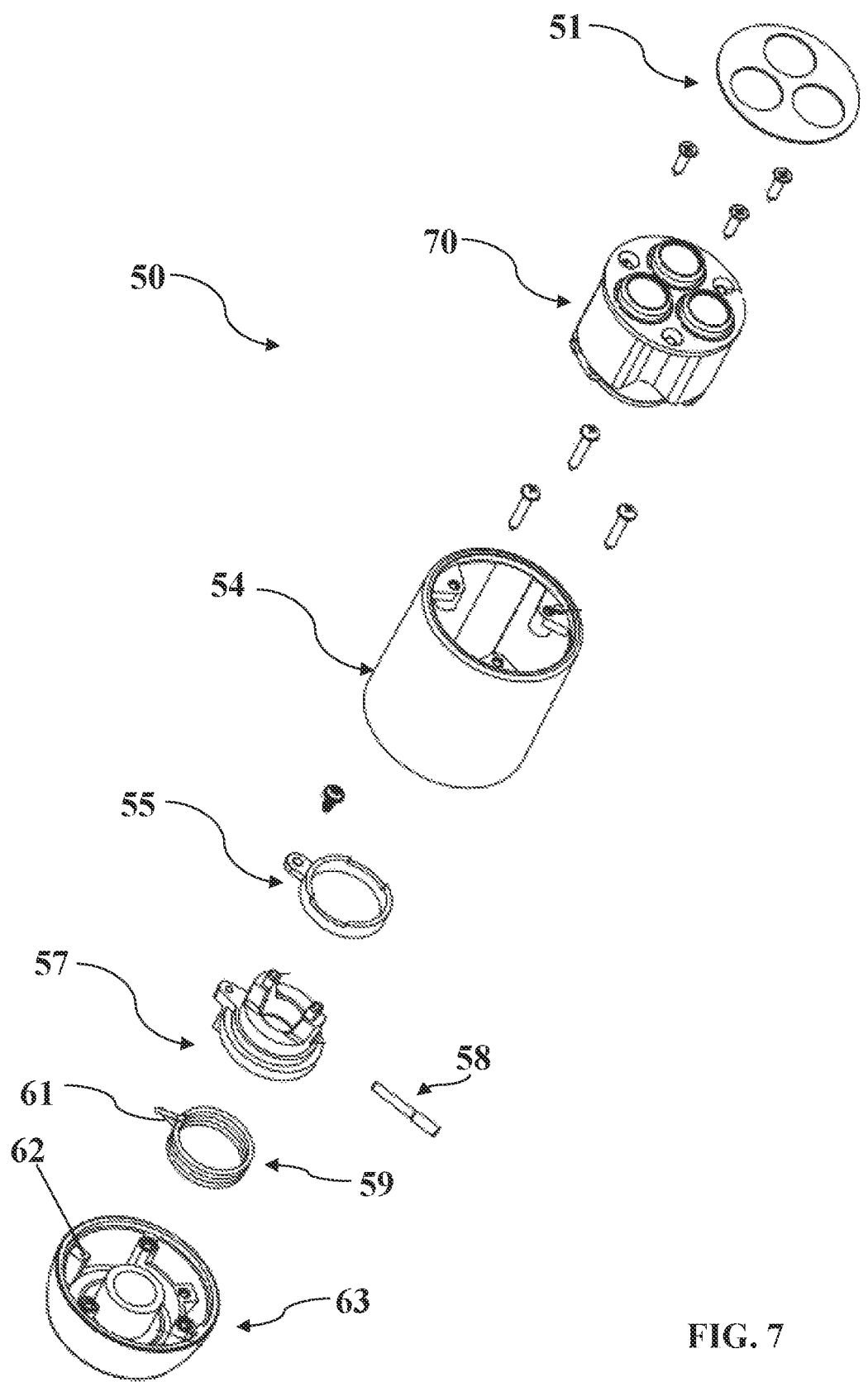
FIG. 7 is an exploded perspective view of a handle assembly of the joystick according to the present invention.
Figure 8:
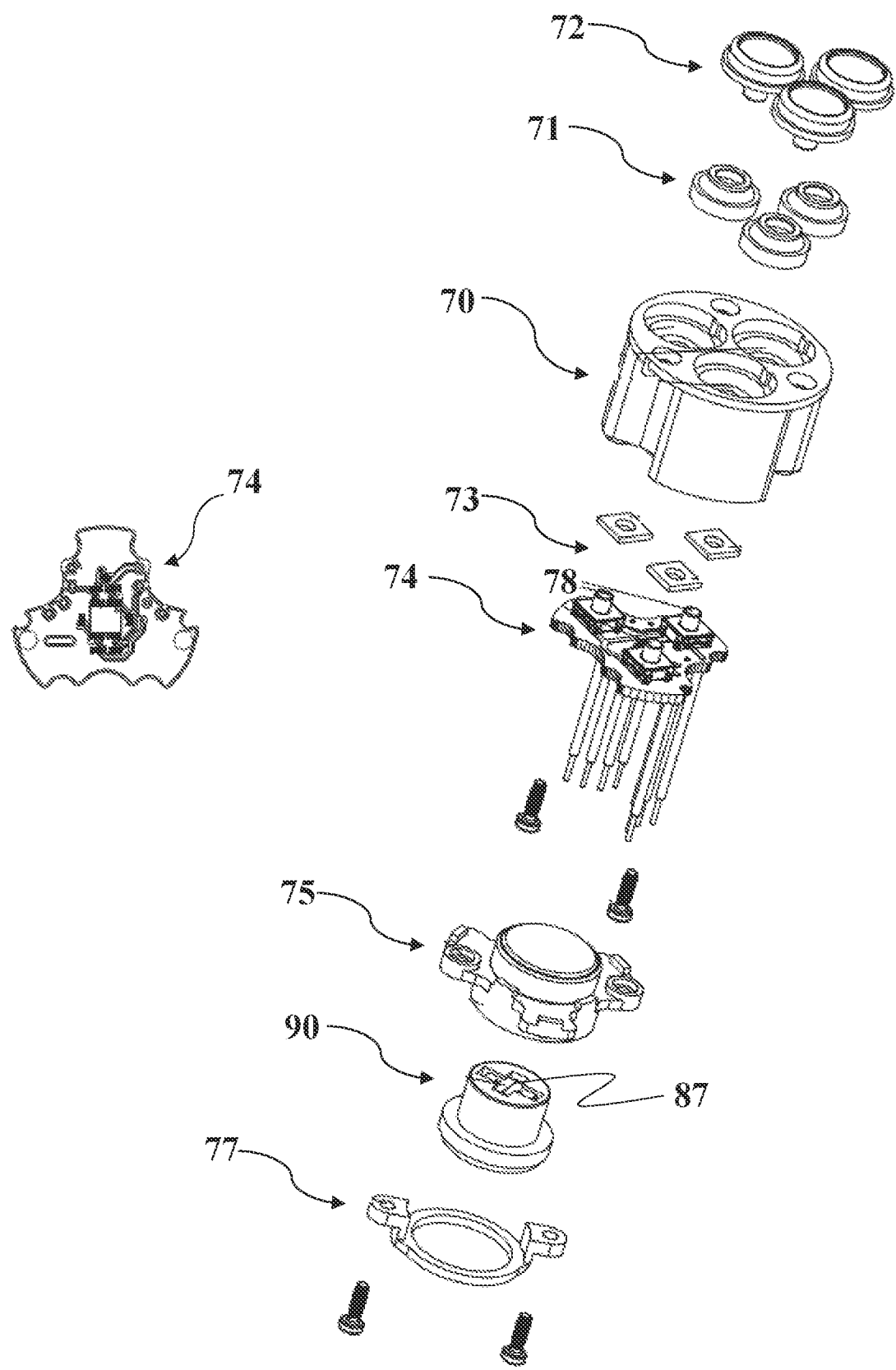
FIG. 8 is an exploded perspective view of a handle assembly of the joystick where an upper circuit and an upper lever part are shown according to the present invention.

With reference to FIGS. 2A, 6, and 7, the handle assembly (50) has a substantially cylindrical, shaped upper rotary body (54) which is arranged to rotate around a central axis extending along a longitudinal direction of the joystick (100). Said upper rotary body (54) is placed on a lower handle housing (63) having a central hole portion into which the control lever (80) in a longitudinal direction. As shown in FIG. 8, said lower handle housing (63) can have a protrusion (62) as an elongated protrusion arranged to be biased by a spring arm (61) of a spring (59) located in the lower handle housing (63). The spring (59) may be a coil spring acting as a torsion spring or pressure spring.

In another embodiment, said handle housing (63) can be eliminated, said upper rotary body (54) can have a skirt portion which covers bottom portion of the handle housing (63). The handle assembly (50) has a button body (70) which is encapsulated by the upper rotary body (54) of the handle assembly (50). The upper body can be rotated relative to the control portion (30) is provided. The upper rotary body (54) can rotate to adjust the machine (i.e., making a zoom, or adjust the speed). And an arrow may be drawn at the top of the upper rotary body (54) to indicate the operating direction of the upper rotary body (54). Moreover, the control portion (30) has a flexible boot (60) that surrounds the control lever (80) and pivotal mechanism so as to protect the components from ingress of materials such as grits that could damage the components as shown in FIGS. 3A and 3B. The flexible boot (60) can be used with a plurality of fastening members.

A locking member (57) having at least one connection protrusion arranged to match with a corresponding housing of an upper lever part (90) wherein the locking member (57) is attached to the control lever (80). The upper lever part (90) can have two grooves shaped and dimensioned to match with corresponding connection protrusions of the locking member (57). Said grooves is mainly provided at the bottom of the upper lever part (90) and the number of the grooves (56) can be increased or decreased. In another embodiment of the invention, said locking member (57) can be bonded or glued to the upper control lever (80) and in another embodiment, said locking member (57) can be omitted and only the control lever (80) can have same protrusions as in the locking member (57) or the upper control lever (80) can be attached to the control lever (80) by gluing or bonding.

Referring to the FIG. 9, the button body (70), as a core portion, has at least one button hole and the each button hole is provided with a button (72) and a button spring (71), made from a resiliently deformable material for providing tactile effect, associated with a button switch (78) provided on an upper circuit (74). Referring to the FIG. 9, each button (72) and the button switch (78) have a sealing member (73) provided therebetween to provide sealing thereof. The sealing member (73) has a cross-section one of a circular shape, a square shape, elliptical shape or any other polygonal shape. Said button spring is placed within the corresponding button hole of the button body (70) and related buttons (72) are associated with said button springs (71). Preferably, the button body (70) is provided with a button plate (51) placed on the button body (70) after a plurality of fastening members is attached to the button body (70). Said button plate (51) is, preferably, opaque and has cylindrical apertures for matching with the buttons (72). With this arrangement, it is provided that the buttons (72) to be lightened. In a possible embodiment, said locking member (57) has two extending elongated connection protrusions arranged to keep the upper lever part (90) in an upright position. The locking member (57) has a hollow body into which one end of the control lever (80) is introduced and aligned to match with an upper pin hole of the control lever (80). When the locking member (57) is aligned with the upper pin hole of the control lever (80), an upper pin (58) is used to connect said locking member (57) to the control lever (80) and the upper lever part (90) is arranged on the locking member (57). Said locking member (57) can be used with a fixing ring (55) which has a connection hole on an outwardly extending protrusion for attaching to the locking member (57). The upper lever part (90) is placed within an upper magnet housing (75) facing to the upper circuit (74) of the handle assembly (50) such that said upper lever part (90) can be positioned centrically within the handle assembly (50) and an upper magnet (87) in the upper lever part (90) is kept safely. Said upper magnet housing (75) has at least one groove and protrusion to be attached within the handle assembly (50). The upper lever part (90) can have an outwardly extended rim which abuts against an inner housing of the upper magnet housing (75) when the upper lever part (90) is placed in the upper magnet housing (75). Preferably, the joystick may include a locking ring (77) such that the locking ring (77) is provided with the upper magnet housing (75) to secure the upper lever part (90) and offers a more durable structure.

In the exemplary embodiment, the said casing (34) may be configured as in a two-part form which can be defined as a rear cover (342) and a front cover (341). Said two part-form of assembly of the case provides mounting advantage and ease of repair.

Figure 4:
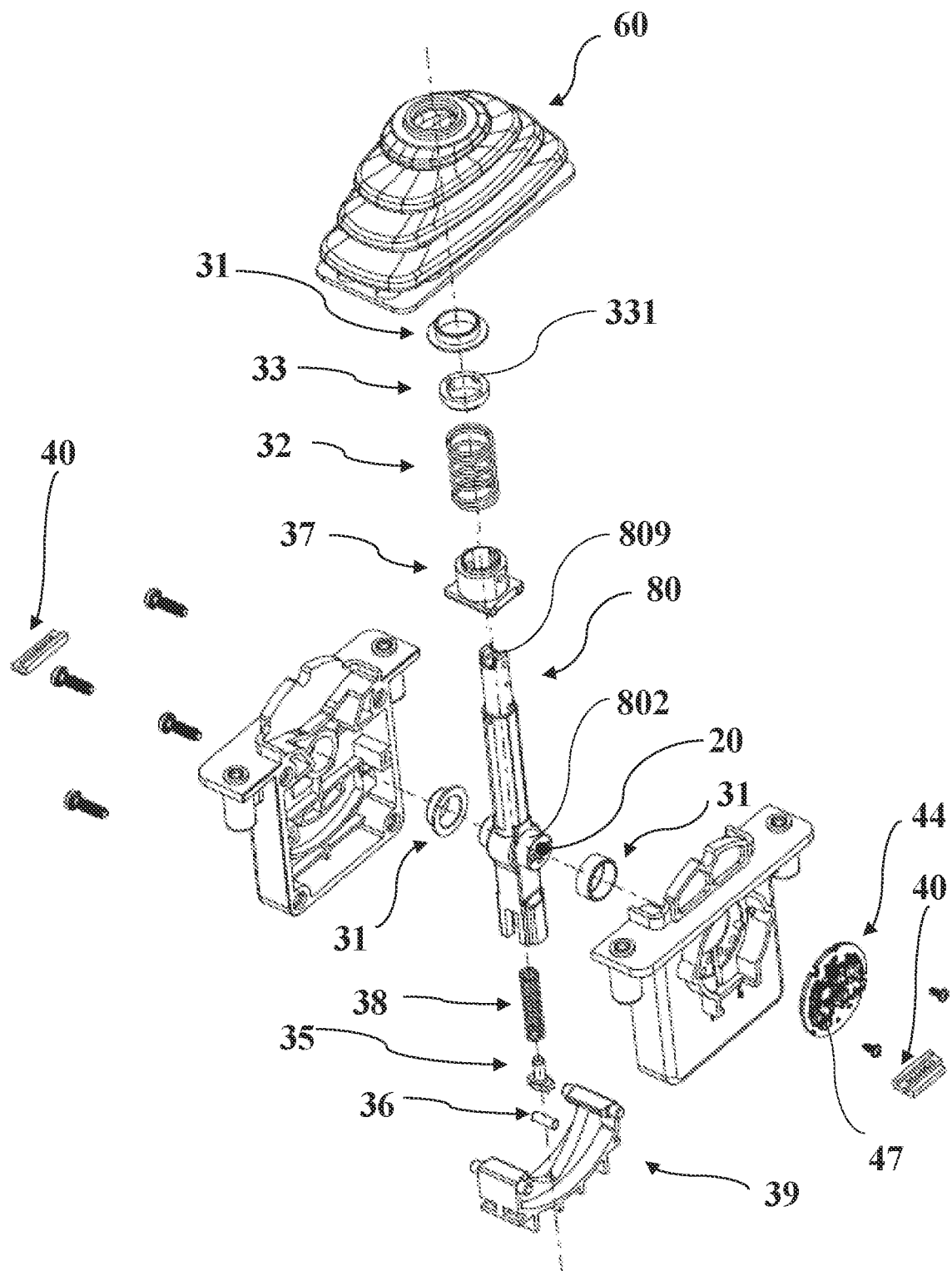
FIG. 4 is an exploded perspective view of the joystick according to the present invention.

In the exemplary embodiment, said control lever (80) has a lower end (806) formed as an elongated recess in which a spring (38) is placed to exert a predetermined force wherein said lower end (806) has a substantially U-shaped cross section. Accordingly, said joystick (100) includes a ball holder (35) having a groove (351) shaped and dimensioned to match with a ball (36) wherein the ball holder (35) is formed with an elongated protrusion extending in a direction with respect to the longitudinal axis of the control lever (80) in which the spring (38) is arranged Referring to FIG. 4, the joystick (100) further comprising a lower sensor (47) to sense changes in a magnetic field and produce an output that is proportional to intensity of the field. It will be apparent that the lower sensor (47) being provided to sense the different positions of the control lever (80), in particular to sense angular movement of the magnet, and to generate an output which may be used to control machine functions. Moreover, said lower sensor (47) can be arranged to vary its output voltage in response to a magnetic field. Thus, the joystick (100) provides reliable and accurate output signals.

Figure 15:
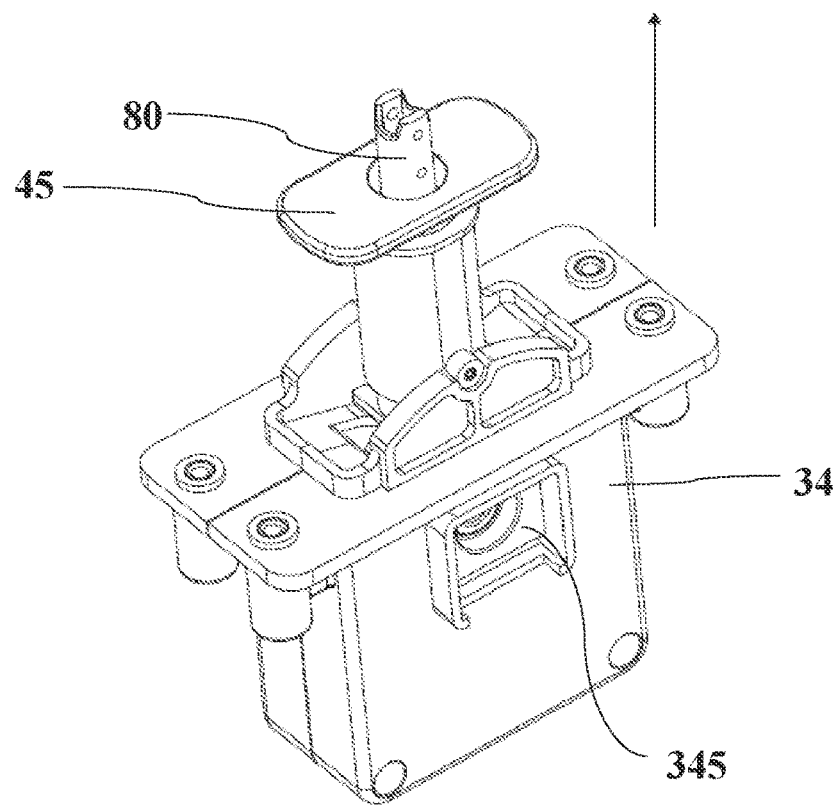
FIG. 15 is a perspective view of the joystick with latch version according to the present Invention.

In a possible embodiment of the invention, a lower circuit (44) having a lower sensor (47) is placed in a housing (345) which shaped and formed in a suitable manner provided on the outer surface of the casing (34) as shown in FIG. 15. Said lower circuit (44) is generally a printed circuit board. The fact that said housing (345) is configured on the outer surface of the casing (34) has made it easy to manufacture.

In another possible embodiment, the joystick (100) further comprises a retention plate (37) having a planar protrusion and recess on the upper portion thereof which configured to interact with a spring (32) such that said retention plate (37) may retain the spring (32) and prevent undesired displacement of the spring (32).

Preferably, an embodiment of the invention may comprise a bushing (31) so as to increase the working performance of the joystick (100), a spring (32) which seated on and exerts a force against a retention plate (37) and a spring locking ring (33) having at least one horizontal recess (331) suitable for tight fitting with a protrusion (808) is disposed on the spring (32) without any screws or similar fixing element requirement by means of said recess (331).

In an exemplary embodiment, said lower end (806) of the control lever (80) in which a spring (38) placed to exert a predetermined force may have a substantially U-shaped cross section. As can be seen most clearly in FIGS. 10-14 said joystick (100) comprises a bottom guiding portion (39) having a planar lower part and a semi-circular shaped upper part suitable for movement of a ball (36). As the user actuates the control device, movement of a spring (38) in response to the application of a force thereto compresses the spring (38) and causes it to exert a force against the lower end (806) of the control lever (80).

Figure 14:
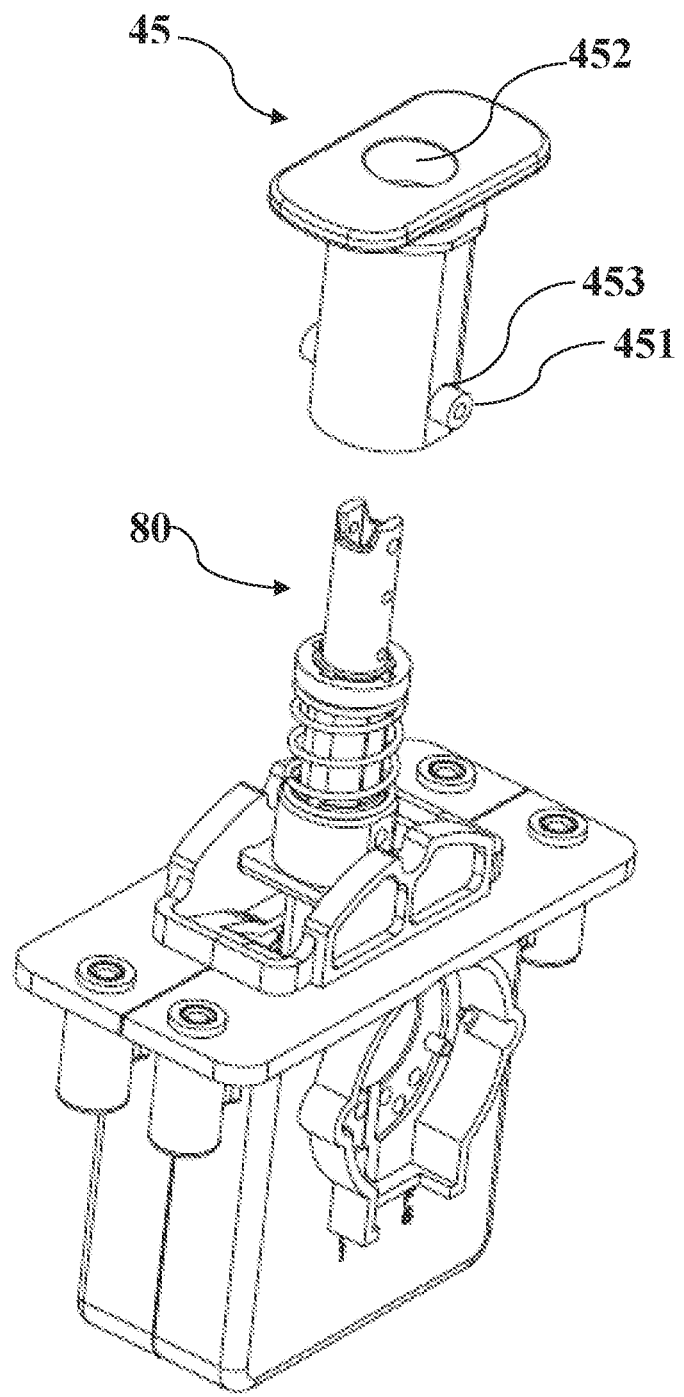
FIG. 14 is partially exploded perspective view of the joystick comprising a locking plate according to the present invention.

In a possible embodiment the bottom guiding portion (39) can be configured in a shape and size to be placed in the corresponding housing wherein said bottom guiding portion (39) which is located in the lower portion of the casing (34) may have a stopping structure (392) such as a detent that formed as a barrier to restrict movement of the control lever (80) in a predetermined location such that said detent (392) may provide haptic feed-back when the control lever (80) is at or near that stop positions shown in FIG. 14. An operator who controls a device or machine can feet resistance as trying to move the control lever (80) and then can understand that more torque must be transferred to the control lever (80) for hurdling the detent. In such situations, the control lever (80) can be connected to an output shaft of a gear system.

Various industrial applications require the last movement of the control lever (80) maintained. With reference to FIG. 11, in this manner the joystick (100) may comprise a friction plate (48) formed as a half-moon shape so as to fit into a housing (344) disposed on the inner surface of the front cover (341) of the casing (34) as shown in FIG. 12. In addition to the friction plate (48), an upper surface (393) of bottom guiding portion (39) also exhibits friction properties. Accordingly, as the user actuates the control device, further force or torque is required due to friction in order for the user to move the control lever (80) along the bottom guiding portion (39). In cases where no more force is applied by the user, the control lever (80) is retained at the position where it is left by the user.

In some cases, a float configuration can be achieved with a joystick (100) that has a lock facility to prevent movement of the control lever (80) in the direction that controls vertical movement of a bucket. When the joystick is locked, the vertical controls are overridden.

The deflection of the control lever (80) can be precluded to prevent improper movements and provide a more secure vehicle control. As seen in FIG. 15, the joystick (100) may further comprise a locking plate (45) having a plate-like upper portion and tubular body through which a cylindrical channel (452) extends wherein said cylindrical channel (452) is configured to engage with the control level (80).

Figure 16:
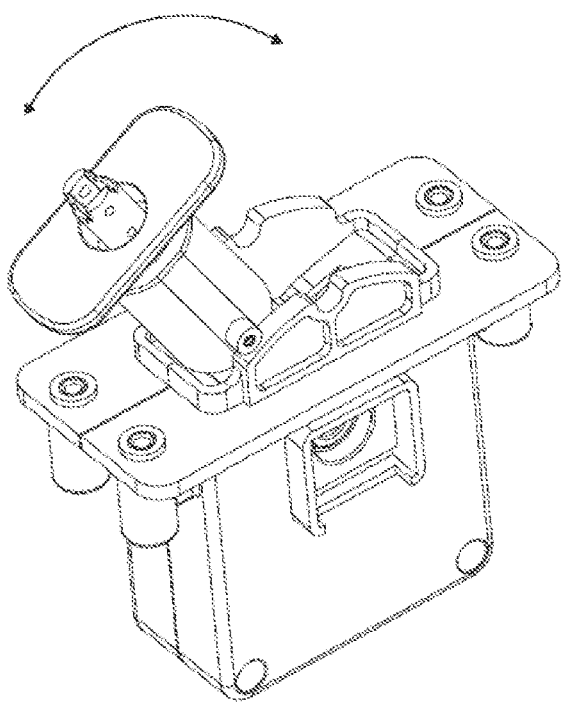
FIG. 16 is a perspective view of the joystick with latch version according to the present invention.

The retention plate (37) is pulled upwards in +Y direction and then a groove (451), which is provided in a protrusion (453) on the outer lower surface of the locking plate (45), is aligned with the fixing aperture on the side surface of the retention plate (37) and fixed with the fixing elements. In this manner, the spring (32) pushes both the retention plate (37) and the locking plate (45) downwards −Y direction. In latch version shown in FIG. 16, the locking plate (45) having protrusions (453) ensconces in a recess (348) of the casing when the controller is locked. Afterwards, the locking plate (45) is pulled upward +Y direction, the protrusion (453) of the locking plate (45) moves out of a corresponding recess (348), accordingly the lock is released and subsequently, the control lever starts to move. Hence, a more secure is provided for motion control in a cost-effective way.

In another embodiment of the present invention, the joystick (100) comprises a sealing plate (40) made of a flexible material such that the sealing plate (40) penetrates the housing (345) and wraps connection members thereof at least partly tightly by providing holes for the connection members to pass through. In addition, the housing (345) in which circuit board, provided can be filled with epoxy for additional sealing. Besides protecting against dust and dirt, the cables are prevented from being damaged by the flexible cable holes. Hence, the sealing plate (40) allows the joystick (100) to work more safely.

What is claimed is:

1. A joystick for controlling a machine, comprising a handle assembly, a control portion, and a control lever, wherein
    the handle assembly is allowed to rotate around a central axis extending along a longitudinal direction of the joystick,
    the control portion has a casing, and a lower circuit with a lower sensor is provided in the casing,
    the control lever is attached to the casing so as to move pivotally about at a pivot axis, wherein the pivot axis extends perpendicularly to the longitudinal axis of the control lever;
    the control lever comprises at least one embedded lower magnet, at least one pivotal protrusion and a second pivotal protrusion, wherein
    the at least one embedded lower magnet is manufactured from plastic by an injection molding;
    the at least one pivotal protrusion extends outwardly from the control lever for bearing in a first housing of the casing;
    the at least one pivotal protrusion forms a monolithic structure with the control lever by the injection molding and in the monolithic structure;
    the at least one embedded lower magnet is embedded within the at least one pivotal protrusion to be in proximity with the lower circuit;
    the second pivotal protrusion is arranged in an opposite side of the control lever, wherein the second pivotal protrusion has at least one hole configured as an outlet opening, and the outlet opening is defines by an inner wall of the second pivotal protrusion.

2. The joystick according to claim 1, wherein the control lever has a channel extending from an upper end of the control lever and facing to an upper rotary body to the second pivotal protrusion, such that the channel enables connection members to be guided through the control lever to protect the connection members from external interferences.

3. The joystick according to claim 2, wherein a spring is placed in a lower end of the control lever to exert a predetermined force and the lower end has a substantially U-shaped cross section.

4. The joystick according to claim 3, wherein a ball holder has a groove shaped and dimensioned to match with a ball, wherein the ball holder is formed with an elongated protrusion extending in a direction with respect to the longitudinal axis of the control lever, wherein the spring is arranged in the elongated protrusion.

5. The joystick according to claim 4, wherein the spring provides an axial biasing action located between the ball holder and the lower end of the control lever.

6. The joystick according to claim 5, further comprising a button body having at least one button hole, wherein button hole is provided with a button and a button spring associated with a button switch, the button switch is provided on an upper circuit, wherein the button and the button switch have a sealing member provided to provide a sealing between the button and the button switch.

7. The joystick according to claim 4, further comprising a locking plate having a plate-like upper portion and a tubular body, wherein a cylindrical channel extends through the tubular body, wherein the cylindrical channel is configured to engage with the control level.

8. The joystick according to claim 7, wherein the casing is configured as in a two-part form.

9. The joystick according to claim 3, further comprising a friction plate formed as a half-moon shape so as to fit into a third housing, and the third housing is disposed on an inner surface of a front cover of the casing.

10. The joystick according to claim 2, further comprising a sealing plate made of a flexible material, wherein the sealing plate has at least one hole for at least one of the connection members to pass through, and the sealing plate wraps at least one of the connection members tightly.

11. The joystick according to, claim 1, wherein the casing comprises a second housing placed on an outer surface of a front cover of the casing and the second housing is sized and shaped with respect to the lower circuit having the lower sensor.

12. The joystick according to claim 11, wherein the lower sensor is configured to sense an angular movement of the embedded lower magnet.

13. The joystick according to claim 1, further comprising a bottom guiding portion having a planar lower part and a semi-circular shaped upper part, wherein a ball is guided in the bottom guiding portion.

14. The joystick according to claim 13, wherein the bottom guiding portion is formed to be in a shape and size so as to be placed in a lower portion of the casing and the bottom guiding portion further comprises a stopping structure.

* * * * *